United States Patent [19]

Pipkorn et al.

[11] Patent Number: 4,622,562

[45] Date of Patent: Nov. 11, 1986

[54] INK JET PRINTHEAD MULTI-COMPONENT HEATING

[75] Inventors: David N. Pipkorn, Centerville; Robert G. Leen, Kettering, both of Ohio

[73] Assignee: Eastman Kodak Company, Rochester, N.Y.

[21] Appl. No.: 722,547

[22] Filed: Apr. 12, 1985

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,050,377 | 9/1977 | Watanabe et al. | 101/114 X |
| 4,106,030 | 8/1978 | Hampton et al. | 346/140 R |
| 4,245,226 | 1/1981 | Paranjpe et al. | 346/75 |

*Primary Examiner*—E. A. Goldberg
*Assistant Examiner*—Gerald E. Preston
*Attorney, Agent, or Firm*—John D. Husser

[57] ABSTRACT

The performance of ink jet printing apparatus is markedly improved by heating critical lower print head surfaces, e.g. the exposed charge plate and catcher surfaces, to a temperature sufficiently above the ink temperature to prevent vapor condensation on those surfaces.

3 Claims, 5 Drawing Figures

INK JET PRINTHEAD MULTI-COMPONENT HEATING

BACKGROUND OF THE INVENTION

1. Field of the Invention

The present invention relates to ink jet printing apparatus and more particularly to improved constructions, for the print head assembly of such apparatus, that eliminate malfunctions due to undesired liquid accumulations.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream from an orifice plate that is in liquid communication with the cavity. Periodic perturbations are imposed on the liquid stream (e.g vibrations by an electromechanical transducer) to cause the stream to break up into uniformly sized and shaped droplets. A charge plate is located proximate the stream break-off point to impart electrical charge in accord with a print information signal and charged droplets are deflected from their nominal trajectory. In one common binary printing apparatus charged droplets are deflected into a catcher assembly and non-charged droplets proceed along their nominal trajectory to the print medium.

The components described above (particularly the orifice plate and charge plate) must be precisely positioned to achieve proper charging, deflection and catching of non-print drops. Even after this is achieved, however, significant problems are presented at each operational start-up. For example, liquid accumulations on the charge plate can cause shorting or improper charging of droplets. Liquid accumulations at undesired locations on the catcher assembly can affect droplet deflection or impede droplet passage to the print medium.

Sophisticated prior art techniques have been developed to avoid the occurrence of such unwanted liquid accumulations on critical surfaces of the print head assembly. For example, complicated routines have been developed for starting-up and shutting down the ink jet streams without depositing ink on the critical print head surfaces. Also, air purging cycles have been provided to remove ink that is undesirably deposited on those surfaces. In some instances it is necessary to stop operation and physically clean the critical print head surfaces.

We have found that even when such procedures are meticulously practiced, malfunctions such as shorting of the drop charging electrodes and inconsistent droplet flights continue to appear at unacceptably short printing intervals. This problem was particularly severe with compact print head structures wherein the lower print head is located quite close to the ink jet printing streams.

After considerable investigation we discovered that one significant cause of such malfunctioning is the build-up of a clear liquid on the critical surfaces of the print head assembly. By further studies we discovered the cause of such clear liquid accumulation and structural embodiments which eliminate it, thus markedly reducing the frequency of ink jet printing apparatus malfunctions.

SUMMARY OF THE INVENTION

Thus, one significant objective of the present invention is to improve the quality and reliability of ink jet printing apparatus, as well as decrease the maintenance required for such apparatus. In general, this objective is accomplished, in accord with the present invention, by providing means for preventing the undesired accumulation of liquid on critical surfaces of the print head assembly.

In one preferred embodiment the present invention provides in ink jet printing apparatus of the type having an upper print head means for directing printing droplets toward a print medium and lower print structure for cooperating with said upper print head means, the improvement comprising means for preventing condensation of ink vapors on such lower print head structure. A particularly preferred construction for preventing such condensation comprises means for heating such lower print head structure to a temperature above the dew point of the vapor atmosphere contiguous it during ink jet printing operation.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
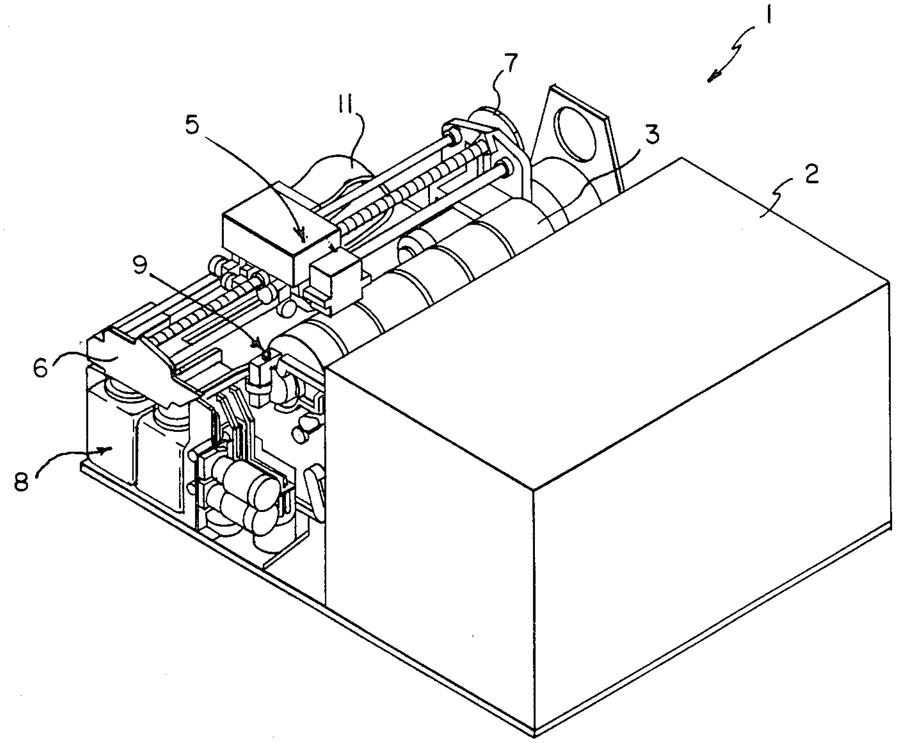
FIG. 1 is a perspective view of one embodiment of ink jet printing apparatus in accord with the present invention.

FIG. 1 illustrates schematically an exemplary ink jet printing apparatus 1 of one type that can advantageously utilize the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the operative cycle of apparatus 1 as will be described subsequently.

Figure 2:
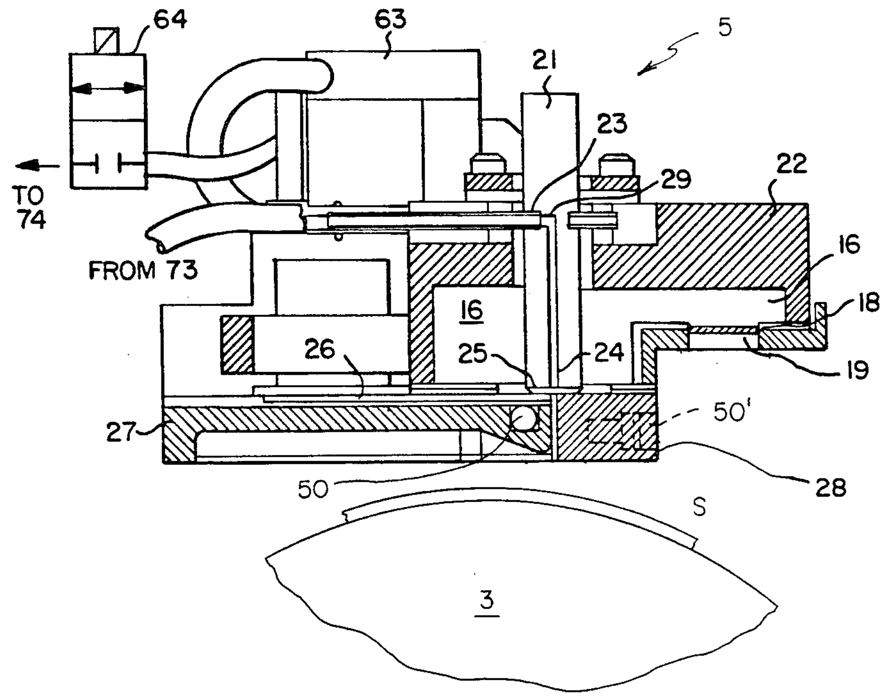
FIG. 2 is a cross-sectional view of a portion of the FIG. 1 apparatus illustrating one embodiment of the upper and lower print head assemblies.

Referring to FIG. 2, one embodiment of print head assembly 5 according to the present invention can be seen in more detail. The assembly 5 includes an upper print head portion including a print head body 21 mounted on housing 22 and having an inlet 23 for receiving ink. The body 21 has a passage leading to a print head cavity 24 and an outlet 29 (see FIG. 3) leading from the cavity 24 to an ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Finally, in this embodiment, the lower print head assembly includes a predeterminedly configured and located wall member 28 which provides protection and air control functions for the printer apparatus. In the preferred embodiment shown in FIG. 2, the gap between the wall 27 and catcher 28 can be 0.03 inches or closer so that the ink jet streams pass therebetween in close proximity to the wall surfaces.

The ink supply and circulation system of the FIG. 1 apparatus includes various ink conduits (i.e. lines) which form an ink recirculation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet to a junction between catcher return line 75 and the main ink return line 76. An ink return line 79 also extends from station 9 back to cartridge 8. An air bleed line 78 extends from main filter 61 back to cartridge 8 and an ink bypass line 77 extends from a juncture with line 73 also back to cartridge 8. The FIG. 3 system also includes an ink heater 61, a flow restrictor 62, final filter 63, head return valve 64, temperature sensor 65 and pressure sensor 66. As will be clear from subsequent descriptions, the present invention is not limited to use with the particular ink circulation line arrangement illustrated in FIG. 3.

Figure 3:
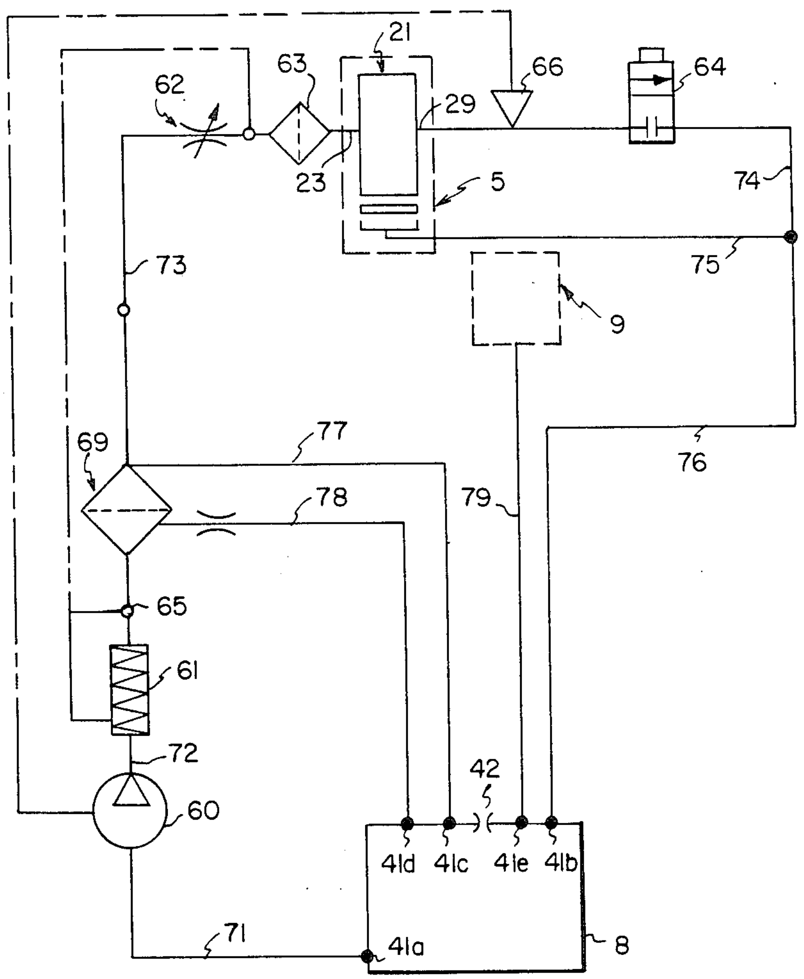
FIG. 3 is a diagrammatic illustration of the ink supply system of the apparatus shown in FIG. 1.

As shown in FIGS. 1 and 3, cartridge 8 can be in a form that is constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect with lines 71, 76, 77, 78 and 79 upon insertion of the ink cartridge 8 into its mounting in the printer apparatus. Cartridge 8 can have a vent 42 to render the main interior thereof at atmospheric pressure. The cartridge can be constructed with an internal venturi structure which effects return of ink from return line 76 and is disclosed in more detail in concurrently filed U.S. application Ser. No. 772,548, entitled "Ink Supply Cartridge and Cooperative Ink Circulation System of Continuous Ink Jet Printer" by McCann, Piatt and Williams. However, the present invention can function equally well in a circulation system utilizing a separate vacuum pump to withdraw ink from the return lines back to the cartridge.

Heater 61, under the feedback control of sensor(s) 65, conditions the circulating ink to the proper operating temperature and pressure sensor 66 regulates pump 60 to attain the proper ambient line circulation pressure. When valve 64 is closed, ink passing into the print head 20 issues as ink streams from the orifice plate of the print head. The ink streams will break into droplets either in an uncontrolled manner or in a controlled manner under the influence of a stimulating transducer as subsequently described.

Referring again to FIG. 2, one preferred construction for preventing the accumulation of undesired liquid on operative surfaces of the lower print head is shown. Specifically, a resistance heater 50 is provided within the interior of catcher 27 at a location where its thermal energy can be readily conducted to raise the temperature of: (1) portions of the catcher surface 27b that are adjacent the droplet stream passing from orifice 25 to print substrate S and (2) the exposed surfaces of charge plate 26. The details of this construction are shown more clearly in FIG. 4 and it can be seen that heater element is affixed in a cavity 51 by means of a thermally conductive adhesive 52. The main body of the catcher is preferably formed of stainless steel or filled plastic; however, other material having a good thermal conductivity can be used in accord with this embodiment of the present invention.

Figure 4:
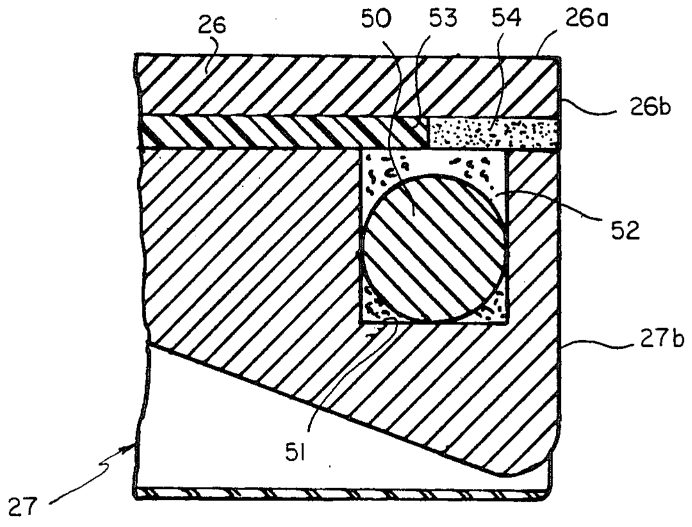
FIG. 4 is an enlarged cross-sectional view of a portion of apparatus shown in FIG. 2.

In the embodiment shown in FIG. 4 a spacer element 53, e.g plastic shim material, is provided in an interior region between the charge plate and catcher and a plastic potting material, e.g. and epoxy resin, 54 couples the top of the catcher with charge plate 26. Thus, both surface 26a (which bears electrode leads) and surface 26b (which bears the drop charging electrodes) are heatable by heater 50 to a selected temperature above ambient.

Figure 5:
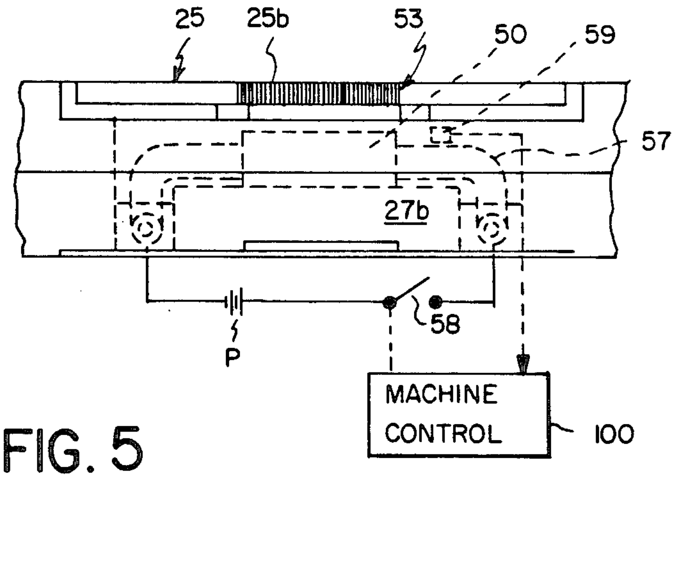
FIG. 5 is an enlarged frontal view of a portion of the apparatus shown in FIG. 2.

FIG. 5 is a front view of the lower print head assembly illustrating in hidden lines the circuit leads 56, 57 for the resistive heater 50 and diagrammatically the switch 58 that operates under control of machine control 100 to selectively energize the power source P for the heater 50. If desired a temperature sensor 59 is coupled to the catcher to provide an input to control 100 that maintains the heated surfaces of the print head assembly at the proper temperature. Alternatively the heater can operate at a predeterminedly fixed power level.

In this regard, it is preferred that the heater operate to maintain the print head surfaces at the minimum temperature that will reliably insure that contiguous vapor does not condense on them. This minimum temperature will depend upon the nominal operating ink temperature, the spacing between the ink jet streams and the charge plate and catcher surfaces and the ambient humidity and temperature. In general, it should be above the dew point of the region around the ink jet streams. In one preferred embodiment with an issuing ink temperature of about 85° F., heating that raised the portions of the catcher surface to temperatures of 106° F. and 110° F. was found sufficient to prevent condensation on both the catcher and charge plate. Smaller temperature differentials can be utilized and one skilled in the art can determine operable temperature differentials by visual observation while changing the applied heating power.

The embodiment of heating means illustrated and described above is highly advantageous for ink jet printing apparatus wherein the print head is traversed with respect to a print substrate. However, other means for preventing condensation of ink vapors during printing operation can be used in accord with the concept of the invention. For example, radiant heating means located to direct energy to the pertinent surfaces can be used in some apparatus constructions. Also means for providing a heated air stream across the pertinent surfaces can be utilized. Other implementations will occur to those skilled in the art.

While the invention has been described with respect to continuous ink jet printing apparatus and the prevention of condensation on the charge plate and/or catcher surfaces thereof, it has application to other ink jet printers (e.g. drop on demand printers) and to the prevention of condensate accumulation on other structures (e.g. protective wall structure such as shown at 28 in FIG. 2). Thus, a heater element such as shown at 50' in FIG. 2 can also be provided in such other lower print head structure.

The invention has been described in detail with particular reference to preferred embodiments thereof, but it will be understood that variations and modifications can be effected within the spirit and scope of the invention.

What is claimed is:

1. In continuous ink jet printing apparatus of the type having means for generating an ink droplet stream(s) from ink supplied thereto, a charge plate having an electrode(s) for selectively imparting electrical charge to droplets of such stream(s) and catcher means for catching a portion of such droplets in response to the charging or non-charging thereof, the improvement wherein said charge plate and said catcher means are physically coupled for conductive transfer of thermal energy and comprising heater means in said catcher means for heating the operative surfaces of both said charge plate and said catcher menas to a temperature preventing condensation of ink vapors.

2. In continuous ink jet printing apparatus of the type having means for generating continuous ink droplet streams from ink supplied thereto under pressure, a charge plate, for selectively imparting electrical charge to droplets of such streams and a catcher for catching charge droplets, the improvement wherein (i) said charge plate includes a charging electrode surface and an electrode lead surface and (ii) said charge plate and said catcher are physically coupled for conductive transfer of thermal energy and comprising means located within said catcher for heating the charge electrode and electrode lead surfaces of said charge plate and the catching surface of said catcher to a temperature that is sufficiently above the dew point of the contiguous vapor atmosphere to prevent condensation of such vapor on those surfaces.

3. The invention defined in claim 2 further comprising a wall member in opposing relation to said charge plate and catcher surfaces on the opposite side therefrom of said droplet streams and second heating means located within said wall member for heating the opposing surface of said wall member to a temperature preventing ink vapor condensation thereon.

* * * * *